Patented May 23, 1939

2,159,909

UNITED STATES PATENT OFFICE 2,159,909

DISINTEGRATION OF BARYTES ORES

Charles W. Price, Sweetwater, Tenn.

No Drawing. Application July 20, 1935, Serial No. 32,448. Renewed October 14, 1938

1 Claim. (Cl. 209—11)

The present invention relates to the production of relatively pure, finely divided barium sulphate from barium sulphate mineral (barytes or heavy spar) in a highly economical and efficient manner.

The process is of value where it is desired to obtain a relatively pure finely divided barium sulphate product, for example suitable for use as a pigment by merely the step of fine grinding, although it will be understood that a subsequent chemical treatment for the removal of any residual traces of iron or silica is not precluded.

Native barytes frequently contain large pieces of ferric oxide or hydrated ferric oxide, and quartz crystals, the iron compound and the silica being often associated together, in nodules or relatively large size pieces, and the barytes being in the form of more or less irregularly shaped pieces, of half an inch to a foot in diameter. In very many instances the iron compounds and silica will be segregated as a large hard crust at a particular part (say on one side) of the piece of barium sulphate.

I have found that by the simple expedient of rapidly heating the barium sulphate mineral, in the form of lumps or granules, for example in a rotary muffle, to temperatures between 500 and 1,000° C. the barium sulphate in said mineral will decrepitate and break up into a pulverulent mass of which about 60% will pass a 100 mesh screen, and usually a much larger percentage will pass an 80 mesh or 60 mesh screen. Although the rapid heating to the temperature stated, causes decrepitation of substantially all of the barium sulphate, it does not have any similar effect upon the iron compounds or silica present.

It is generally advisable to subject the barytes ore, to a washing treatment to remove clay, soil, loose sand, and the like, after which the mineral is dried and preferably run through a crusher in which pieces larger than one inch or two inches are broken up. During this breaking up operation, there will be a substantial amount of fine material produced, and the crushed product (say crushed to pass a two inch or one inch mesh screen) is passed over a fine screen, say a 20 mesh screen, which operation will of itself remove a considerable amount of iron oxide and silica, these being frequently in a much more brittle state than the barium sulphate in the barytes. This screening operation may remove in some instances from one-quarter to one-half of the iron present and about the same percentage of the silica present.

The heating operation should preferably be conducted quite rapidly, and should be such preferably as to heat the material to at least 500° C., such operation, on materials passing a two inch mesh screen may require about 4 to 6 minutes more or less. Temperatures in excess of 1000° C. do not seem to give any added improvement. The length of time of heating varies substantially, depending upon the temperature. It will be understood that heating to a higher temperature for a shorter period of time is to some degree the equivalent of heating to a lower temperature for a longer period of time. In the heat treatment at 500° C. about 4 to 10 minutes of time is preferably allowed for the material to pass through the said heating furnace. The heating furnace may consist of a rotary tubular muffle mounted in a furnace, or a rotary kiln, with an oil or gas flame introduced at the lower end, can be used. If the highest temperature is to be about 500° C., then an iron pipe can be used as the rotary retort, in which to heat the barytes after washing and crushing if desired.

In a further modification of the process, in which a minimum temperature of about 600° C. is employed, it is advisable to heat the ore as rapidly as possible to said temperature while in the presence of a reducing atmosphere, for instance by adding solid carbonaceous matter with the barytes, or by heating the ore in a rotary kiln by a reducing flame. Oil fuel or gas can be suitably used for this purpose. Obviously, in this form of execution of the process, free access of outside air to the barytes ore, during the heating up of the ore, is prevented. This prevention of free access of air is useful as apparently giving a more uniform decrepitated product, which contains only a minimum amount of soluble compounds (including soluble iron compounds). This is important because soluble iron compounds discolor the fine decrepitated barium sulphate and lower its grade. The object of the reducing condition is to reduce more or less of the ferric oxide into a magnetic condition, in order that the iron can be largely separated from the calcined barytes, by a magnetic treatment.

In carrying out the latter, and preferred modification of the process, the muffle or kiln may be a tube of chrome nickel steel, which is well known to be highly resistant to heat. If a muffle is used, the mixture of crushed barytes ore, of the size indicated above, preferably after passing over a 20 mesh screen to remove fine material, is introduced at the upper end of the inclined muffle, together with powdered carbon, to serve as a reducing agent, and a sufficiently high temperature is maintained by a coal fire or other heating means surrounding the said muffle, to give a temperature of substantially above 600° C. inside of the muffle, so that the barium sulphate is rapidly heated to this temperature, to cause decrepitation, and to cause reduction of the ferric iron, (ferric oxide). The mixture may pass through the furnace in about 5 to 10 minutes, during which time the ferric oxide will be largely reduced to a magnetic condition, the barium sulphate will decrepitate into a powdery condition, and the material leaving the muffle may be separated by passing the same over an endless belt conveyor in contact with suitable magnets to remove the magnetic iron material, which may also remove considerable of the silica which will be carried mechanically by the reduced iron material. The material left can then be passed over fine screens such as 60 mesh, 80 mesh, 100 mesh, or a series of such screens. A considerable portion of this material can also be separated by air flotation, to give a very finely divided relatively pure barium sulphate product.

In another modification, as indicated above, the washed, crushed and sifted ore can be introduced into the upper end of a rotary kiln, and heated by a reducing flame which will cause decepitation of the barium sulphate and reduction of the ferric oxide to a magnetic condition. This is a cheap and highly effective method of carrying out the process, but the flame should be carefully adjusted so as not to cause deposition of large amounts of carbon or soot on the barium sulphate, which of course would be objectionable on account of blackening the product. It is readily possible by this method to heat the mineral very rapidly to temperatures considerably in excess of 600, and temperatures of 1,000° C. are readily producible by such a method.

In some cases it may be advisable to treat the material leaving the decrepitation furnace, by first passing this over sieves of 100 mesh, 80 mesh, 60 mesh and the like, thereby removing the larger pieces of iron and silica, and then to subject the same to a magnetic separation of the conventional type, for removing finely divided magnetic iron materials, and for this operation it is more or less immaterial whether the larger pieces of iron oxide in the ore material are completely reduced or not.

In a particular case, the material being fed into the rotary kiln was barytes containing 85% of barium sulphate, 8.4% of iron oxide and 4.1% of silica. This material after treatment in the furnace, and after being separated by the screens and by magnetic treatment, had the following analysis: barium sulphate 98.32%, iron oxide, 0.11%, silica 0.11%. Such a material is entirely satisfactory for producing a pigment or for various other uses of barium sulphate.

Reference was made above to coal fired and oil fired furnaces. Gas fired and electrically heated furnaces also can be used when available.

In the modification where carbon is added as a reducer for the iron, I can use two pounds of carbon for each 1% of iron, per ton of the ore (barytes). A centrally arranged oil burner, at the exit end of a rotary kiln, is satisfactory as a reducing and heating means, no carbon being added.

I have recovered an average of over 93% of the $BaSO_4$ on runs without the reducing step, this being without carbon added, in an inclined rotary muffle, the ore moving about a foot a minute, 40 lbs. of ore being fed in, each minute.

I claim:

A process of treating ferruginous siliceous native barytes which comprises subjecting the same, in a condition substantially free from adhering clay, sand and the like, and when of a size to pass a screen of about two inch mesh, but substantially free from fines passing a screen of about 20 mesh, and containing siliceous and ferruginous substances as the chief impurities, to a rapid heating to at least about 600° C., but below the melting point of barium sulphates, such heat treatment being conducted in a reducing atmosphere, to effect rapid decrepitation of the barium sulphate component and to effect reduction of a large part at least of the iron to render the iron magnetic, subjecting the mass to magnetic separation to thereby remove a large part at least of the iron from the finely divided barium sulphate and separating out the fine barium sulphate from the coarse impurities.

CHARLES W. PRICE.